United States Patent
Strashny et al.

(10) Patent No.: US 10,113,617 B2
(45) Date of Patent: Oct. 30, 2018

(54) PROPULSION SYSTEM

(71) Applicant: Perkins Engines Company Limited, Peterborough (GB)

(72) Inventors: Igor Strashny, Peterborough (GB); Michael G. Cronin, Peoria, IL (US)

(73) Assignee: Perkins Engines Company Limited, Peterborough (GB)

(*) Notice: Subject to any disclaimer, the term of this patent is extended or adjusted under 35 U.S.C. 154(b) by 401 days.

(21) Appl. No.: 15/022,904

(22) PCT Filed: Apr. 17, 2014

(86) PCT No.: PCT/GB2014/051218
§ 371 (c)(1),
(2) Date: Mar. 17, 2016

(87) PCT Pub. No.: WO2014/184517
PCT Pub. Date: Nov. 20, 2014

(65) Prior Publication Data
US 2016/0265631 A1    Sep. 15, 2016

(30) Foreign Application Priority Data

May 17, 2013 (GB) .................................. 1308932.1

(51) Int. Cl.
*F16H 3/72* (2006.01)
*B60K 6/365* (2007.10)
(Continued)

(52) U.S. Cl.
CPC ............. *F16H 3/724* (2013.01); *B60K 6/365* (2013.01); *B60K 6/442* (2013.01); *B60K 6/445* (2013.01);
(Continued)

(58) Field of Classification Search
None
See application file for complete search history.

(56) References Cited

U.S. PATENT DOCUMENTS 5,683,322 A * 11/1997 Meyerle .................. B60T 1/093
                                                    475/72
6,007,444 A * 12/1999 Kinokami ............... F16H 47/04
                                                    475/72
(Continued)

FOREIGN PATENT DOCUMENTS

CN    101209666    7/2008
CN    101283171    10/2008
(Continued)

OTHER PUBLICATIONS

Bady et al, Hybrid-Elektrofahrzeuge—strukturen und zukunftige Entwicklungen, Nov./Dec. 5, 2000.
(Continued)

*Primary Examiner* — Justin Holmes
(74) *Attorney, Agent, or Firm* — Finnegan, Henderson, Farabow, Garrett & Dunner, LLP

(57) ABSTRACT

A propulsion system for providing a power output is disclosed. The propulsion system may have a transmission configured to provide the power output. The propulsion system may also have at least one first energy conversion machine. Further, the propulsion system may have at least one power unit. The power unit may be operable to selectively drive at least one of the transmission and the at least one first energy conversion machine. The propulsion system may also have at least one second energy conversion machine. The second energy conversion machine may be operable to selectively drive or be driven by the transmission. In addition, the propulsion system may have a power transfer arrangement for transferring power between the first and second energy conversion machines.

15 Claims, 9 Drawing Sheets

(51) Int. Cl.
  *B63H 21/20* (2006.01)
  *B60K 6/445* (2007.10)
  *F16H 47/04* (2006.01)
  *B60K 6/442* (2007.10)
  *B60K 17/08* (2006.01)
  *H02K 7/18* (2006.01)

(52) U.S. Cl.
  CPC ............ *B60K 17/08* (2013.01); *B63H 21/20* (2013.01); *F16H 47/04* (2013.01); *H02K 7/1807* (2013.01); *B60Y 2200/92* (2013.01); *B60Y 2300/182* (2013.01); *B60Y 2400/73* (2013.01); *B63H 2021/202* (2013.01); *B63H 2021/205* (2013.01); *B63H 2021/207* (2013.01); *Y02T 10/6239* (2013.01); *Y02T 70/5236* (2013.01); *Y10S 903/91* (2013.01)

(56) References Cited

U.S. PATENT DOCUMENTS

| | | | |
|---|---|---|---|
| 6,380,640 | B1 | 4/2002 | Kanamori et al. |
| 2010/0144219 | A1 | 6/2010 | Balogh et al. |
| 2012/0309242 | A1 | 12/2012 | Haugland |

FOREIGN PATENT DOCUMENTS

| | | |
|---|---|---|
| CN | 101326098 | 12/2008 |
| CN | 201694383 | 1/2011 |
| CN | 102307781 | 1/2012 |
| DE | 10049387 A1 | 7/2001 |
| EP | 2578428 A2 | 4/2013 |
| GB | 764005 | 12/1956 |
| WO | WO 2010/128897 | 11/2010 |

OTHER PUBLICATIONS

Search Report dated Sep. 13, 2013, Application No. GB1308932.1 (1 page).
International Search Report dated Oct. 21, 2014, International Application No. PCT/GB2014/051218 (3 pages).
Examination Report dated May 21, 2015, Application No. GB1308932.1 (3 pages).
Presentation titled "Hybrid Electric Vehicles—Structures and Developments," Institute for Automotive Engineering, dated May 11, 2000 (29 pages).

* cited by examiner

Prior Art

PROPULSION SYSTEM

CLAIM FOR PRIORITY

This application is a U.S. National Phase entry under 35 U.S.C. § 371 from PCT International Application No. PCT/GB2014/051218, filed Apr. 17, 2014, which claims benefit of priority of GB Patent Application No. 1308932.1, filed May 17, 2013, all of which are incorporated herein by reference.

TECHNICAL FIELD

This disclosure is directed towards a propulsion system suitable for work machines. In one embodiment the propulsion system comprises a power unit which provides power to a transmission via a mechanical and/or alternate route and the transmission provides a power output. In another embodiment the propulsion system comprises a power unit which drives a planetary gearbox. The propulsion system is particularly applicable to marine vessels.

BACKGROUND

Propulsion systems for work machines typically comprise one or more power units, such as gas turbines and engines. Such work machines include vehicles, such as marine vessels, aircraft or land vehicles. The power output from the power units may, for example, provide the required loads to house loads, operator quarters or work tools. Exemplary work tools include cranes, drills, bow or stern thrusters, grapples, buckets and backhoes. If the work machine is a vehicle, the power may provide a thrust to move the vehicle.

The range of potential power output from the power unit may be selected in order to meet the expected loads required in the operating profiles of the work machine. There are also environmental and cost reduction benefits in operating such power units efficiently. In particular, the power unit may be selected to operate at maximum efficiency at the vehicle cruising speed, which is the speed at which the vehicle moves for the majority of the time it is operational.

By way of example, marine tankers have an operating profile in which the majority of time is spent at cruising speed. Such tankers may not include a transmission, or may have a relatively simple transmission, provided by a shaft transferring power between the power unit and propeller. It may therefore be fairly simple to select an appropriately sized power unit to operate efficiently at cruising speed. However, it may not be possible to operate the power unit at maximum efficiency if the vessel's operating profile is relatively varied.

As another example, the operating profile of a tugboat includes substantial time spent maneuvering, which requires low power; substantial time spent travelling at medium speed, which requires medium power; and substantial time spent pushing or towing other ships, which requires high power. It has been found that tugboats can spend the majority of their operating time at below 20% of the rated load of the power unit providing thrust.

Marine vessels typically comprise either a mechanical or an electrical propulsion system. An electrical propulsion system may comprise a one or more power unit(s) driving an electric generator, which feeds power to at least one electric motor to drive one or more propeller(s). FIG. 1 illustrates a prior art ship 10, in this case an anchor handling tug supply vessel, comprising a mechanical propulsion system 11. The mechanical propulsion system typically comprises a power unit 12, such as a diesel engine, rotating a drive shaft 13. The drive shaft 13 supplies power to a gearbox 14, the output of which is connected to a propeller shaft 15. A propeller 16, which in this example is a fixed propeller, is connected to the propeller shaft 15 to provide a thrust to the ship 10. The power unit 12 may also supply power to an electric generator, which may be used to provide power to the operator quarters 17, bow thrusters 18, stern thrusters 19 and crane 20.

As illustrated in FIG. 2, the gearbox 14 is typically relatively simple and may comprise an input gear 21 attached to the drive shaft 13 and an output gear 22 attached to the propeller shaft 15. The input and output gears 21, 22 may interlock in a countershaft arrangement. The output gear diameter 23 may depend upon the gear ratio required of the gearbox 14. Therefore, if a large reduction in rotational speed between the drive shaft 13 and propeller shaft 15 is required, the output gear diameter 23 may be relatively large. As the output gear 22 is typically located in a keel 24 of the ship 10, the keel 24 may have to be relatively wide to accommodate the output gear 22. A relatively wide keel 24, however, may have a negative impact upon the operational efficiency of the ship 10 due to, for example, increased drag. If the gearbox 14 has a high reduction gear ratio, the width of the keel 24 will depend upon the largest output gear diameter 23.

Marine vessels may also comprise variable pitch propellers, rather than fixed pitch propellers, to improve operational efficiency. The power unit may be run at a more efficient power output whilst the propeller pitch is varied in order to change the ship speed. However, such variable pitch propellers may have drawbacks, for example high cost and complexity, in comparison with fixed pitch propellers. Furthermore, when a hydraulic actuation mechanism is utilised to vary the propeller pitch, oil from the actuation mechanism may cause water pollution. For example, the variable pitch propeller may require a larger hub to house the actuation mechanism which results in an increase in drag in comparison to fixed pitch propellers. In addition, the efficiency of the variable pitch propeller may only be at an optimum at a certain pitch angle and may reduce significantly as the pitch angle is varied. Also, it is not possible to effectively fit a shroud or duct around a variable pitch propeller due to the variation in propeller diameter as the pitch is varied. Shrouded or ducted fixed pitch propellers may have significant efficiency advantages in some applications. Shrouds may be used to improve propeller output efficiency by reducing radial losses and improving axial thrust. However, it may be difficult to provide the same flexibility as provided by a variable pitch propeller, whilst including a shroud.

A hybrid propulsion system may be utilised to improve flexibility, redundancy and efficiency. US-A-2010/0144219 discloses a marine vessel hybrid propulsion system comprising multiple internal combustion engines, multiple electrical generators, multiple electrical motors and multiple propellers. The engines may provide power to the generators and/or to the propellers. The generators may provide energy to be stored in a battery or directed to the motors. The motors may provide energy to the propellers.

However, US-A-2010/0144219 does not disclose how the outputs of the motors and engines can be combined to provide output to a single propeller. Furthermore it does not disclose how the speed of the propeller is controlled. This prior art system also does not provide means for the engines to supply power to the generators whilst both the engines and motors supply power to the propellers. Therefore, the battery may run out of energy to drive the motors. The system also does not provide flexibility in the propeller speed when the engine is run at full operational speed. Furthermore, no means are provided for increasing the propeller speed beyond the speed at which the motor and engines are providing maximum power to the propellers.

SUMMARY

The present disclosure provides a propulsion system for providing a power output; said propulsion system comprising; a transmission configured to provide the power output; at least one first energy conversion machine; at least one power unit operable to selectively drive the transmission and/or the at least one first energy conversion machine; at least one second energy conversion machine operable to selectively drive or be driven by the transmission; and a power transfer arrangement for transferring power between the first and second energy conversion machines.

The present disclosure further provides a method of operating a propulsion system, said propulsion system comprising; a transmission configured to provide the power output; at least one first energy conversion machine; at least one power unit operable to selectively drive the transmission and/or the at least one first energy conversion machine; at least one second energy conversion machine operable to selectively drive or be driven by the transmission; and a power transfer arrangement for transferring power between the first and second energy conversion machines; said method comprising; connecting the power unit to drive the transmission; or connecting the power unit to drive the at least one first energy conversion machine; or connecting the power unit to drive the transmission and the at least one first energy conversion machine.

The present disclosure further provides a marine vessel comprising a propulsion system for providing propulsion to the ship, said propulsion system comprising; a power unit providing a rotational output to a power unit output shaft; a first kinematic connection element attached to the power unit output shaft; and at least one planetary gearbox providing a rotational output to a transmission output shaft, said transmission output shaft being connected to a propulsion element; wherein the first kinematic connection element is operably connected to the at least one planetary gearbox.

The present disclosure further provides a propulsion system comprising; first and second power units; a transmission configured to transmit power to a transmission shaft; at least one first energy conversion machine; and a power unit transmission; wherein said power unit transmission comprises; a plurality of transmission shafts operably connecting the power unit transmission to the first and second power units, the transmission and the at least one first energy conversion machine; a first torque coupling for selectively operably connecting the second power unit to the power unit transmission; and a second torque coupling for selectively operably connecting the transmission to the power unit transmission.

By way of example only, embodiments of a propulsion system are now described with reference to, and as shown in, the accompanying drawings.

DETAILED DESCRIPTION

The present disclosure is generally directed towards a propulsion system comprising at least one power unit operably connected to a transmission via a mechanical route and/or via an alternate route, such as hydraulic or electrical route. The present disclosure is also directed towards a propulsion system wherein a power unit drives or provides power to a planetary gearbox. The present disclosure is also directed towards a propulsion system comprising two power units and a power unit transmission suitable to distribute the power output of two power units via a mechanical route and/or via an alternate route. The propulsion systems are particularly applicable to marine vessels.

In the description below, the term "operably connected" means that one component drives another component, for example by using coupling means. The coupling means may comprise engaged gears, connected shafts, torque converters, clutches, transmissions and any other suitable means for transferring power.

The following exemplary embodiments specifically refer to the use of the propulsion system in marine vessels such as ships. However, the propulsion system may be used in any other form of work machine, such as land vehicles.

Figure 3:
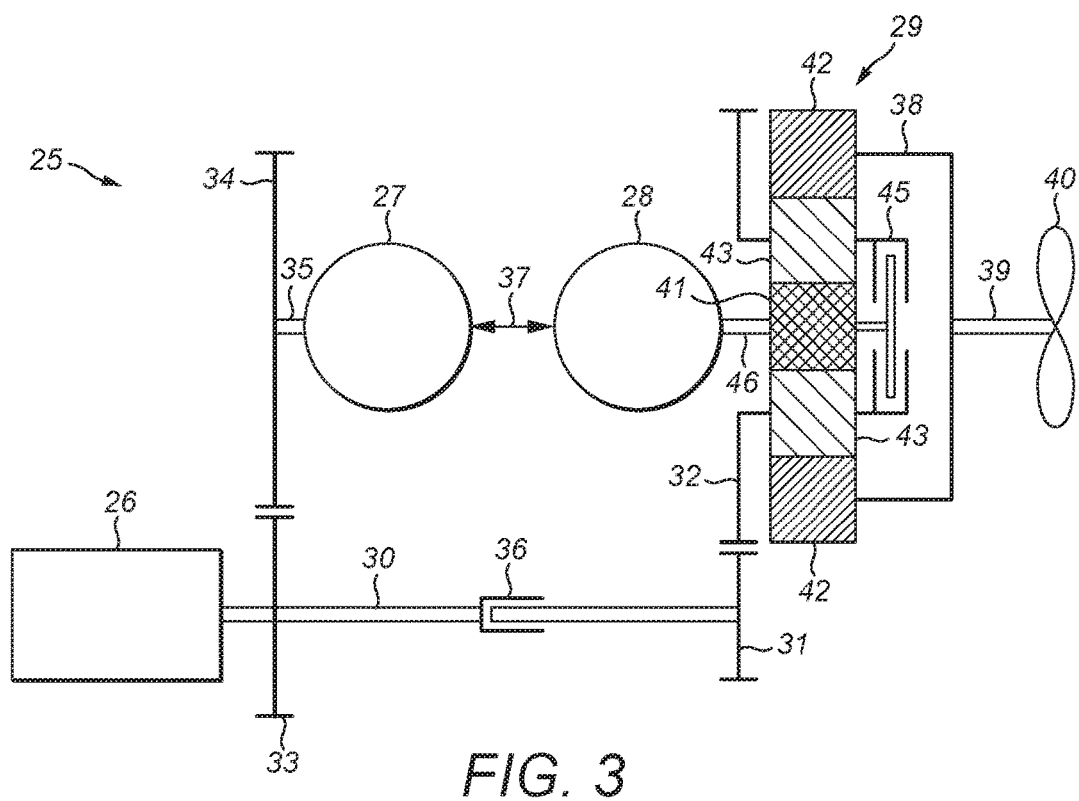
FIG. 3 is a schematic of a propulsion system of the present disclosure.

FIG. 3 illustrates an exemplary propulsion system 25 comprising a power unit 26, a first energy conversion machine 27, a second energy conversion machine 28 and a transmission 29. The power unit 26 may be of any suitable type, for example an internal combustion engine or a gas turbine. The power unit 26 may be capable of providing a variable power output at a range of speeds. For example, the power unit 26 may be a diesel engine. A plurality of power units 26 may be provided and operably connected in parallel as described below.

The power unit 26 is operably connected to the first energy conversion machine 27 and to the transmission 29. The operable connection enables power to be transferred in any direction between the power unit 26, the first energy conversion machine 27 and the transmission 29. The operable connection may be a mechanical connection as shown. The power unit 26 may comprise a rotatable power unit output shaft 30.

The power unit output shaft 30 may be operably connected to the first energy conversion machine 27 and transmission 29 via interlocking gears. A first gear 31 may be mounted on the power unit output shaft 30. The first gear 31 may interlock (mesh) with a second gear 32 mounted on a shaft (not shown) providing an input to, or output from, the transmission 29. A third gear 33 may be mounted on the power unit output shaft 30. The third gear 33 may interlock with a fourth gear 34 mounted on a first machine shaft 35 providing an input to or output from the first energy conversion machine 27. Alternatively, the second and fourth gears 32, 34 may interlock with a single gear mounted on the power unit output shaft 30.

Alternatively, any suitable kinematic connection elements may be provided instead of the first, second, third and fourth gears 31, 32, 33 and 34 to operably connect the power unit output shaft 30 to the transmission 29 and/or the first energy conversion machine 27. For example, the kinematic connection elements may comprise belts, chains and/or gears.

Alternatively, the power unit 26 may comprise one or more power outputs. The power unit 26 may be operably connected to the first energy conversion machine 27 via a first output shaft and to the transmission 29 via a second output shaft. The first output may comprise a main drive output shaft. The second output may comprise an auxiliary power take-off shaft.

Figure 1:
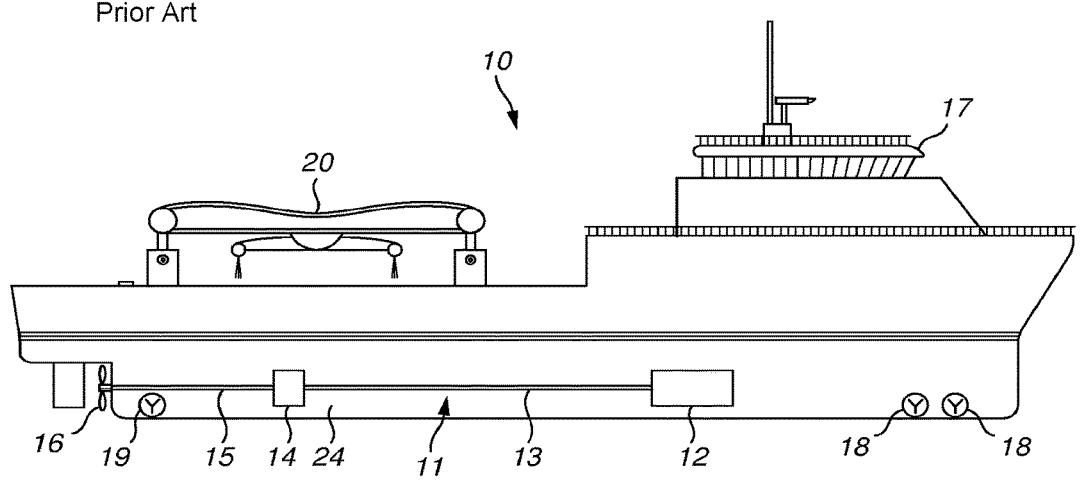
FIG. 1 is a side elevation of a ship of the prior art.
Figure 2:
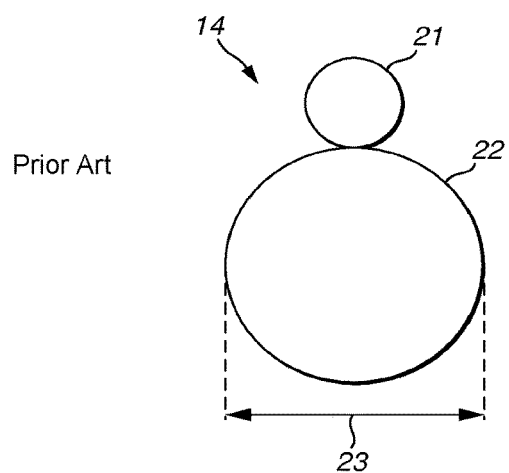
FIG. 2 is a front view of an exemplary transmission arrangement used in the ship of FIG. 1.

A transmission coupling 36 may also be provided to enable the power unit 26 to be selectively operably connected to the first energy conversion machine 27 and/or to the transmission 29. As shown in FIG. 1, the transmission coupling 36 may comprise a clutch located in the power unit output shaft 30 between the first and third gears 31, 33. Further couplings may also be provided in the power unit output shaft 30, for example between the power unit 26 and the third gear 33. The coupling(s) may be mechanical or fluid couplings and may comprise any apparatus suitable for selectively transferring torque.

The first and second energy conversion machines 27, 28 may comprise any suitable means for reversibly converting or transferring energy. In particular, the first and second energy conversion machines 27, 28 may be suitable for converting one form of energy, particularly mechanical, into another, particularly electric or fluid, and vice-versa. For example, the first and second energy conversion machines 27, 28 may be reversible hydraulic machines (i.e. pump/motors) or reversible electric machines (i.e. motor/generators). Alternatively, the first and second energy conversion machines 27, 28 may comprise reversible mechanical machines which enable the transfer of mechanical energy. A plurality of each of the first and second energy conversion machines may be provided and may be connected in parallel as described below.

The first and second energy conversion machines 27, 28 are operably connected to one another to enable power to be supplied to, or received from one another. The operable connection may be provided by a power transfer arrangement 37. The power transfer arrangement 37 may also enable the power transferred between the first and second energy conversion machines 27, 28 to be controlled. For example, the power transfer may be controlled such that the input speed to the first energy conversion machine 27 may be different to the output speed of the second energy conversion machine 28.

The first and second energy conversion machines 27, 28 and the power transfer arrangement 37 may together form a variator. In particular, the variator may enable the stepless variation of the ratio between input and output. The variator may be bi-directional, such that the power input may be to the first energy conversion machine 27 and the power output may be from the second energy conversion machine 28 or vice-versa.

The first and second energy conversion machines 27, 28 may be reversible hydraulic machines, such as variable displacement hydraulic motors and the like. Reversible hydraulic machines convert mechanical energy from a rotating shaft into fluid energy and vice-versa. Alternatively, the first and second energy conversion machines 27, 28 may each comprise a hydraulic pump and a hydraulic motor arranged in parallel such that each can act independently. The power transfer arrangement 37 may comprise a hydraulic system for transferring hydraulic fluid, and thereby energy or power, between the first and second reversible hydraulic machines. The hydraulic system may comprise any suitable arrangement known in the art, for example comprising hoses, pumps, motors, valves, reservoirs, filters, accumulators, seals, connections, charge pumps, charge circuits and/or the like. Exemplary arrangements of the hydraulic system are disclosed below.

Alternatively, the first and second energy conversion machines 27, 28 may be reversible electric machines, such as a reversible electric motor or generator and the like. Reversible electric machines convert mechanical energy from a rotating shaft into electric energy and vice-versa. The reversible electric machines may be DC or AC and may be of any suitable type, for example asynchronous, synchronous, switch reluctance and variable frequency induction motors.

The power transfer arrangement 37 may comprise an electrical system for transferring electric current, and thereby energy or power, between the first and second reversible electric machines. The electrical system may be of any suitable arrangement known in the art, for example comprising inverters, rectifiers, cables, isolators, batteries, power control electronics and the like. The power transfer arrangement may provide power to a house load, operator quarters, a work tool and/or the like. Exemplary arrangements of the electrical system are disclosed below.

The transmission 29 receives power from the power unit 26 and/or the second energy conversion machine 28 and may supply power to a transmission output 38. As shown, the transmission output 38 may comprise or be operably connected to a transmission output shaft 39 to which a propulsion element 40 may be attached. The propulsion element 40 may comprise one or more propellers, thrusters, wheels and other forms of moving a vehicle. Therefore, the transmission 29 may have at least three input and/or output shafts. Any route of power transfer may be provided by the transmission 29, for example power from the power unit 26 may be directed to the second energy conversion machine 28 and to the transmission output 38.

Figure 4:
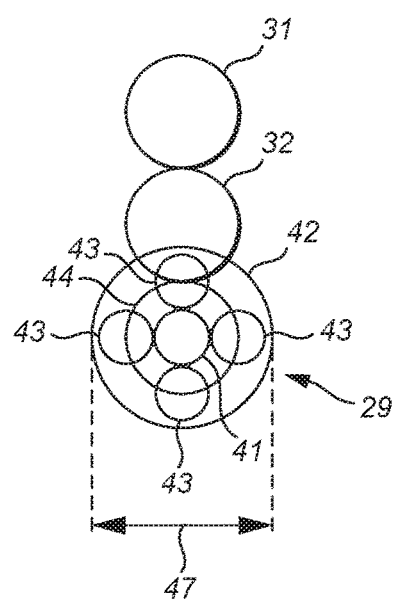
FIG. 4 is a schematic of a transmission of the present disclosure.

The transmission 29 may be of any suitable type known in the art, for example planetary, automatic, continuously variable and the like. As shown in FIGS. 3 and 4, the transmission 29 may be a planetary system comprising a plurality of rotatable gears that transfer power in the same plane. As described below, the transmission may comprise multiple planetary gearboxes arranged in series.

In particular, the transmission 29 may comprise a sun gear 41 encircled by a ring gear 42. The ring gear 42 may comprise inward facing teeth around the inner edge of an annular disc. A plurality of planetary gears 43 may be located between and interlock with the sun gear 41 and ring gear 42. The plurality of planetary gears 43 may be attached about their axles to a carrier 44. A transmission lock 45, for example in the form of a clutch, may be provided to prevent the carrier 44 from rotating. Alternatively, any two of the sun gear, 41, plurality of planetary gears 43, carrier 44 and ring gear 42 may be locked together by the transmission lock 45.

The second energy conversion machine 28 may be operably connected to the sun gear 41, for example via a second machine shaft 46. A second machine coupling (not shown), for example a clutch or torque converter, may be provided in the second machine shaft 46 between the sun gear 41 and second energy conversion machine 28. The second machine coupling may enable the operable connection between the sun gear 41 and second energy conversion machine 28 to be disengaged. Alternatively, the operable connection may be disengaged by switching the second energy conversion machine 28 such that no power is transmitted from the power transfer arrangement to the sun gear 41 and vice versa. For example, if the second energy conversion machine 28 is a variable displacement hydraulic motor a swash plate contained therein may be rotated such that power is not transferred.

The carrier 44 may be operably connected to the power unit 26 via the power unit output shaft 30, the transmission coupling 36, the first gear 31 and the second gear 32. The carrier 44 may be in a countershaft arrangement with the second gear 32. The transmission 29 may have a gearbox width 47, which may be the width of the planetary gearbox.

The ring gear 42 may provide the transmission output 38 that is operably connected to the transmission output shaft 39. In particular, an outer gear may be provided on the outer edge of the ring gear 42 and the outer gear may interlock with a further attached to the transmission output shaft 39.

Figure 5:
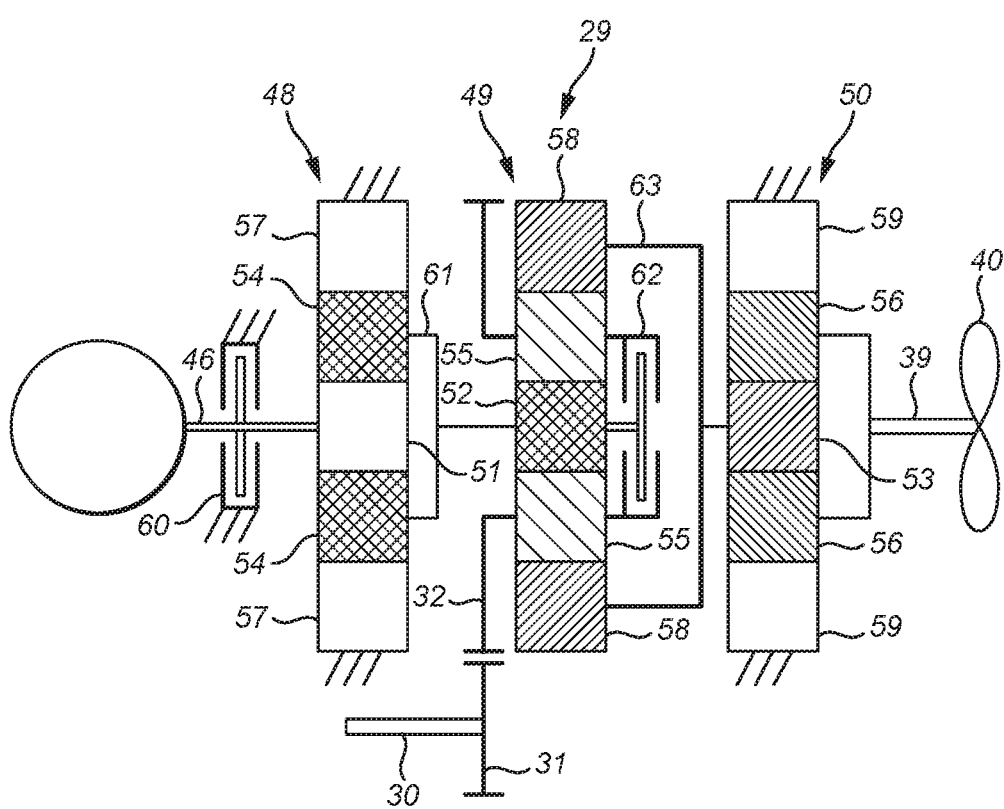
FIG. 5 is a schematic of a transmission of the present disclosure comprising a plurality of planetary gearboxes.

The transmission 29 may comprise a plurality of planetary gearboxes arranged in series. As illustrated in FIG. 5, first, second and third planetary gearboxes 48, 49, 50 may be arranged in series. The second planetary gearbox 49 is arranged in a similar manner to the planetary system described previously herein. The first and third planetary gearboxes 48, 50 are arranged on either side of the second planetary gearbox 49 to provide a reduction or increase in gear ratio from the second machine shaft 46 to the transmission output shaft 39.

Each of the first, second and third planetary gearboxes 48, 49, 50 may comprise a sun gear 51, 52, 53, a carrier (not shown), a plurality of planetary gears 54, 55, 56 and a ring gear 57, 58, 59. The ring gears 57, 59 of the first and third planetary gearboxes 48, 50 may be fixed such that they are unable to rotate. The ring gear 58 of the second planetary gearbox 49 may be rotatable.

A second machine coupling 60 may be provided in the second machine shaft 46, which is operably connected to the sun gear 51 of the first planetary gearbox 48. The carrier of the first planetary gearbox 48 may be operably connected to the sun gear 52 of the second planetary gearbox 49, for example via a shaft 61. The carrier of the second planetary gearbox 49 may be operably connected to the power unit 26 via the first and second gears 19, 20 and the power unit output shaft 30. A transmission lock 62 may be provided to selectively prevent the carrier of the second planetary gearbox 49 from rotating. The ring gear 58 of the second planetary gearbox 49 may be operably connected to the sun gear 53 of the third planetary gearbox 50, for example via a shaft 63. The carrier of the third planetary gearbox 50 may be operably connected to the transmission output shaft 39.

Figure 6:
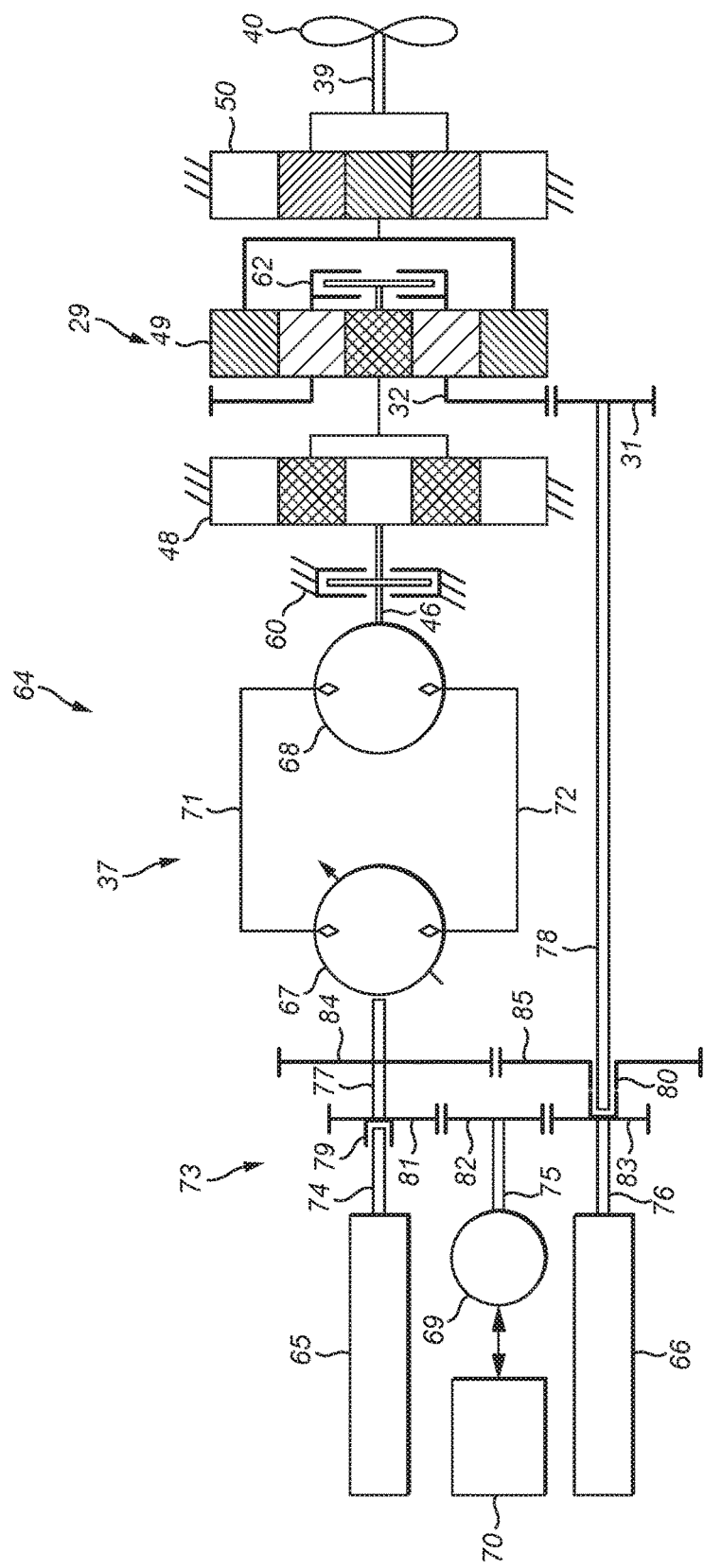
FIG. 6 is a schematic of a further propulsion system of the present disclosure.

A plurality of power units 26 may be provided and operably connected in parallel. FIG. 6 illustrates a propulsion system 64 of the present disclosure comprising first and second power units 65, 66, first and second reversible hydraulic machines 67, 68 and an electrical generator 69 providing power to an electrical system 70. The electrical system 70 may provide power to work tools, thrusters, a hotel load and the like. The transmission 29 is the same as shown in FIG. 5 and the equivalent reference numerals are shown in FIG. 6.

In FIG. 6 the power transfer arrangement 37 comprises hydraulic lines 71, 72 that transfer fluid, and therefore energy, from the first reversible hydraulic machine 67 to the second reversible hydraulic machine 68 and vice-versa. The power transfer arrangement 37 may comprise other hydraulic components, such as reservoirs and charge pumps.

The power units 65, 66 may be operable to provide power to the transmission 29, first reversible hydraulic machine 67 and electrical generator 69 via a power unit transmission 73. The power unit transmission 73 may comprise first, second, third, fourth and fifth transmission shafts 74, 75, 76, 77, 78, first and second torque couplings 79, 80 and first, second, third, fourth and fifth transmission gears 81, 82, 83, 84, 85.

The first transmission shaft 74 may be operably connected to the first power unit 65 and to the first torque coupling 79. The first torque coupling 79 may be operably connected to the fourth transmission shaft 77, upon which may be mounted the first and fourth transmission gears 81, 84. The fourth transmission shaft 77 may be operably connected to the first reversible hydraulic machine 67. The first transmission gear 81 may interlock with the second transmission gear 82, which may be mounted on the second transmission shaft 75. The second transmission shaft 75 may be operably connected to the electrical generator 69. The second transmission gear 82 may also interlock with the third transmission gear 83, which may be mounted upon the third transmission shaft 76. The third transmission shaft 76 may be operably connected to the second power unit 66 and to the second torque coupling 80. The second torque coupling 80 may be operably connected to the fifth transmission shaft 78, upon which the first gear 31 may be mounted. The fifth transmission gear 85 may either be mounted on the third transmission shaft 76 or the third transmission shaft 76 side of the second torque coupling 80 and may interlock with the fourth transmission gear 84.

The first torque coupling 79 may selectively engage the first transmission shaft 74 with the fourth transmission shaft 77. The second torque coupling 80 may selectively engage the third transmission shaft 76 with the fifth transmission shaft 78. The first and second torque couplings 79, 80 may be any suitable apparatus for selectively transmitting torque, for example a clutch or torque converter. The first torque coupling 79 may enable the power unit 65 to be selectively engaged with the power unit transmission 73. The second torque coupling 80 may enable the fifth transmission shaft 78 to be selectively engaged with the rest of the power unit transmission 73. The second torque coupling 80 may operate along similar lines to the transmission coupling 36 described previously herein.

Figure 7:
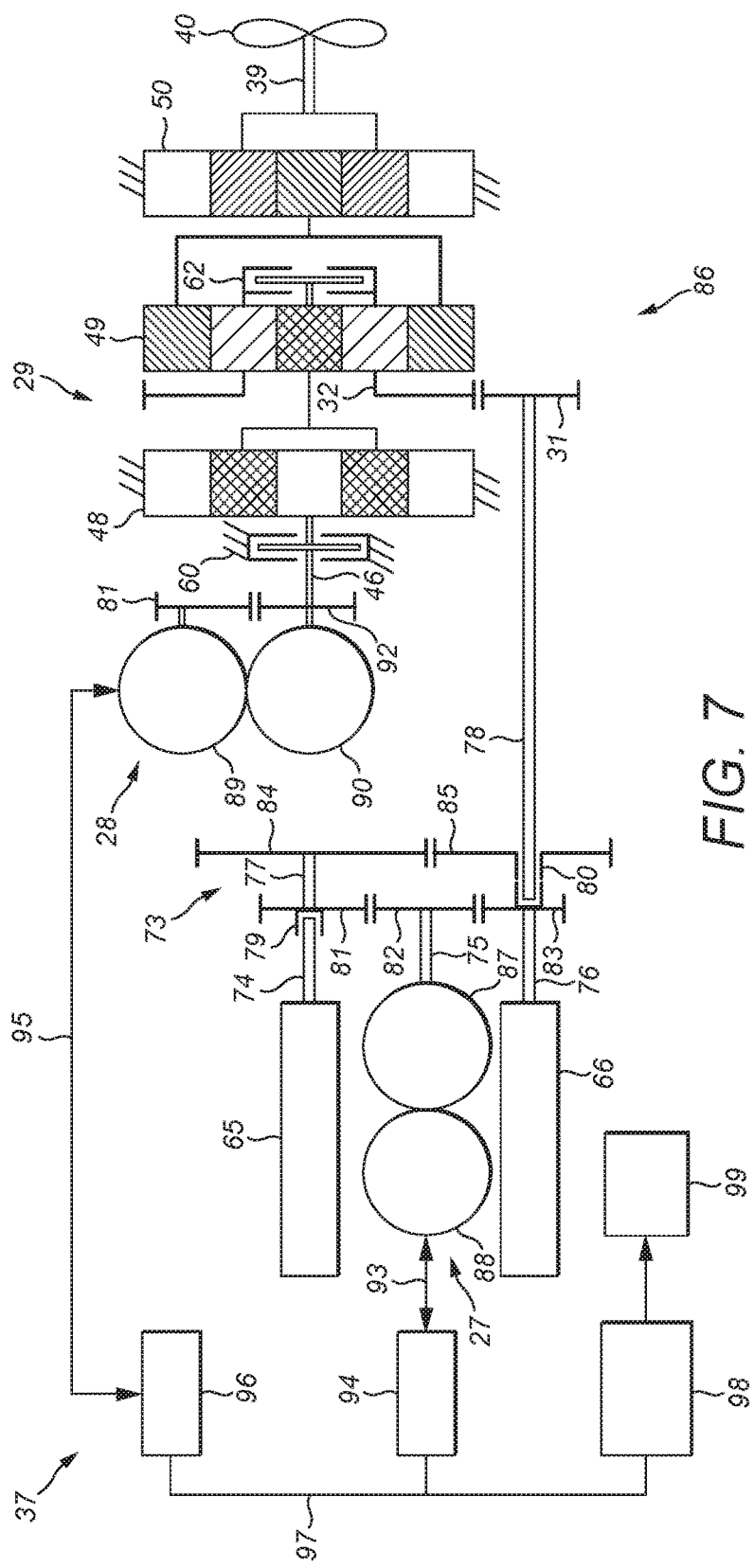
FIG. 7 is a schematic of a further propulsion system of the present disclosure.

FIG. 7 illustrates a propulsion system 86 of the present disclosure that is substantially similar to the propulsion system 64 of FIG. 6. In the propulsion system 86 the second transmission shaft 75 may be operably connected to the first energy conversion machine 27, which may comprise first and second reversible electrical machines 87, 88 connected to one another in series. The second machine shaft 46 may be operably connected to the second energy conversion machine 28, which may comprise third and fourth reversible electrical machines 89, 90. In particular, the fourth reversible electrical machine 90 may be directly connected to the second machine shaft 46. The third reversible electrical machine 89 may provide an output to a gear 91 which interlocks with another gear 92 mounted on the second machine shaft 46. The first, second, third and fourth reversible electrical machines 87, 88, 89, 90 may be selectively operably connected to the second machine shaft 46 or second transmission shaft 75.

The power transfer arrangement 37 may comprise a first conductor 93 for transferring variable frequency AC current between a first inverter/rectifier 94 and the first and second reversible electrical machines 87, 88. A second conductor 95 may be provided for transferring variable frequency AC current between a second inverter/rectifier 96 and the third and fourth reversible electrical machines 89, 90. The first and second inverter/rectifiers 94, 96 may exchange power with a main DC bus 97. The main DC bus 97 may also supply power to an inverter/isolator 98 for providing a fixed frequency AC current to an electrical propulsion system 99. The electrical propulsion system 99 may comprise a hotel load, thrusters, batteries, a work tool and/or the like. A second propulsion system 86 may also feed into/out of the main DC bus 97.

The propulsion system 25, 64, 86 may comprise any number of power units 26, 65, 66, each of which may be selectively operably connected to the transmission 29 and/or the first energy conversion machine 27.

INDUSTRIAL APPLICABILITY

The propulsion system 25 may have at least four modes of operation. The modes are described hereinbelow with reference to the propulsion system 25 of FIG. 3, but may also be engaged in the propulsion systems 64, 86 of FIGS. 6 and 7.

Mechanical Mode

Figure 8:
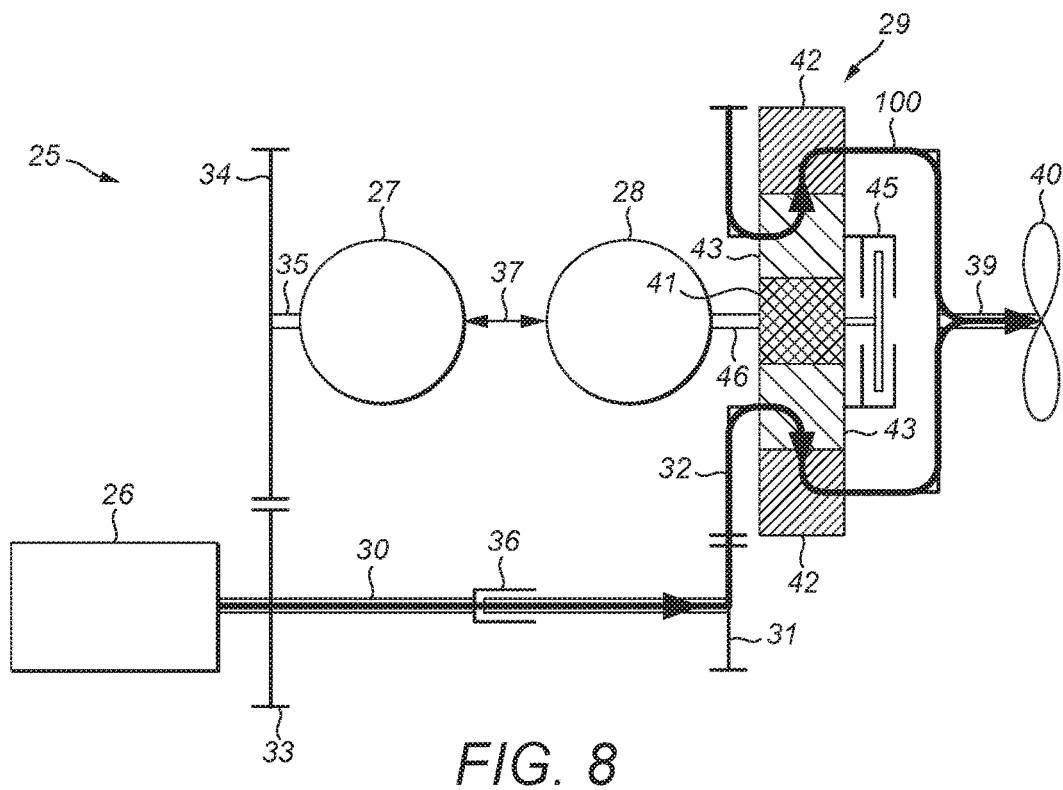
FIG. 8 is a schematic of the propulsion system of FIG. 3 with a mechanical operating mode shown.

As shown in FIG. 8, in a mechanical mode 100 a mechanical route is utilised for transferring power from the power unit 26 to the transmission output shaft 39. The transmission coupling 36 may be engaged such that power is transferred from the power unit 26 to the transmission 29 via the power unit output shaft 30. The transmission 29 receives no power from the second energy conversion machine 28. However, in the mechanical mode 100 power may be transferred from the power unit 26 to the first energy conversion machine 27 to provide power to the power transfer arrangement 37. This power may be transferred to a house load, operator quarter, work tool and/or the like.

In particular, the rotating power unit output shaft 30 may rotate the first gear 31 and thereby rotate the second gear 32. The rotating second gear 32 may rotate the carrier 44. The transmission lock 45 may be disengaged to enable the carrier 44 to rotate. As the carrier 44 rotates, the plurality of planetary gears 43 may also rotate and thereby rotate the ring gear 42. The rotating ring gear 42 thereby transfers power to the transmission output shaft 39. The sun gear 41 may also rotate, but power may not be transferred to the second energy conversion machine 28. This may, for example, be due to the disengagement of a second machine coupling in the second machine shaft 46.

Alternate Power Mode

Figure 9:
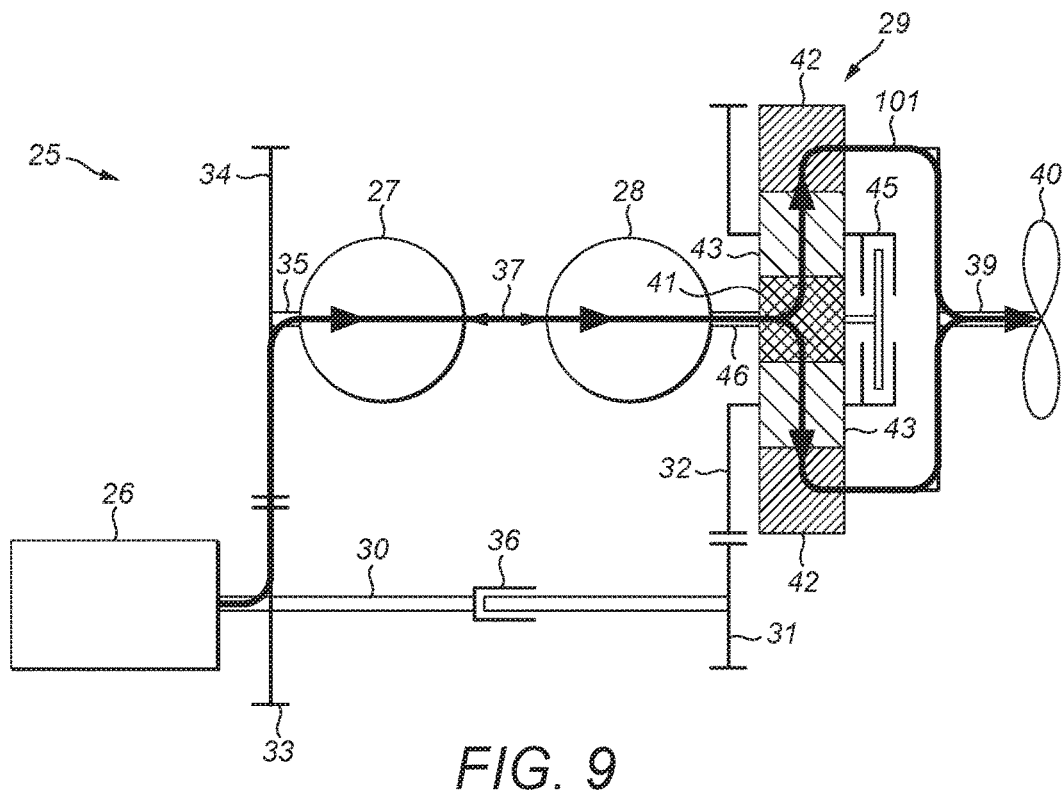
FIG. 9 is a schematic of the propulsion system of FIG. 3 with an alternate operating mode shown.

As shown in FIG. 9, in an alternate power mode 101 an alternate route is utilised for transferring power from the power unit 26 to the transmission output shaft 39. The transmission coupling 36 remains disengaged such that the transmission 29 receives no power mechanically from the power unit 26. The power unit 26 may supply power to the first energy conversion machine 27, which operates as a power generator (i.e. a hydraulic pump or electric generator). The power transfer arrangement 37 may transfer the power to the second energy conversion machine 28, which operates as a motor (i.e. a hydraulic or electric motor), and to the transmission 29. The transmission 29 may then transfer the power to the transmission output 38 and onto the propulsion element 40. In particular, the transmission lock 45 may be engaged to prevent the carrier 44 from rotating. Therefore, power may transferred from the rotating second machine shaft 46 and sun gear 41 to the ring gear 42 by rotating the planetary gears 43. The ring gear 42 may also rotate, thereby transferring power to the transmission output shaft 39.

Combined Power Mode

Figure 10:
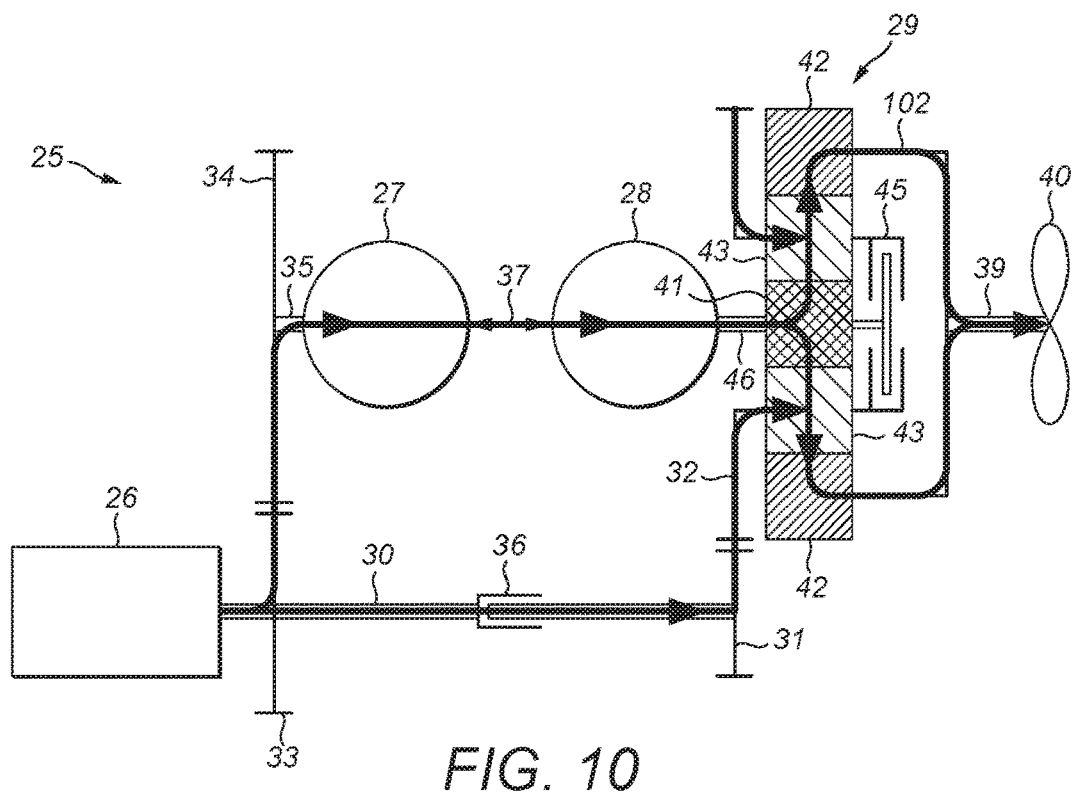
FIG. 10 is a schematic of the propulsion system of FIG. 3 with a combined operating mode shown.

As shown in FIG. 10, in a combined power mode 102 the power may be supplied to the transmission output shaft 39 from the power unit 26 via a combination of the mechanical route and alternate route disclosed above. The transmission coupling 36 may be engaged and the transmission lock 45 disengaged. In particular, power may be transferred sequentially via the third gear 33, the fourth gear 34, the first machine shaft 35, the first energy conversion machine 27, the power transfer arrangement 37, the second energy conversion machine 28, the second machine shaft 46, the sun gear 41 and the plurality of planetary gears 43 to the ring gear 42. Power may also be transferred sequentially via the power unit output shaft 30, the engaged transmission coupling 36, the first gear 31, the second gear 32, the carrier 44 and the plurality of planetary gears 43 to the ring gear 42. The ring gear 42 may transfer the combined power from both routes to the transmission output shaft 39.

Reverse Power Mode

Figure 11:
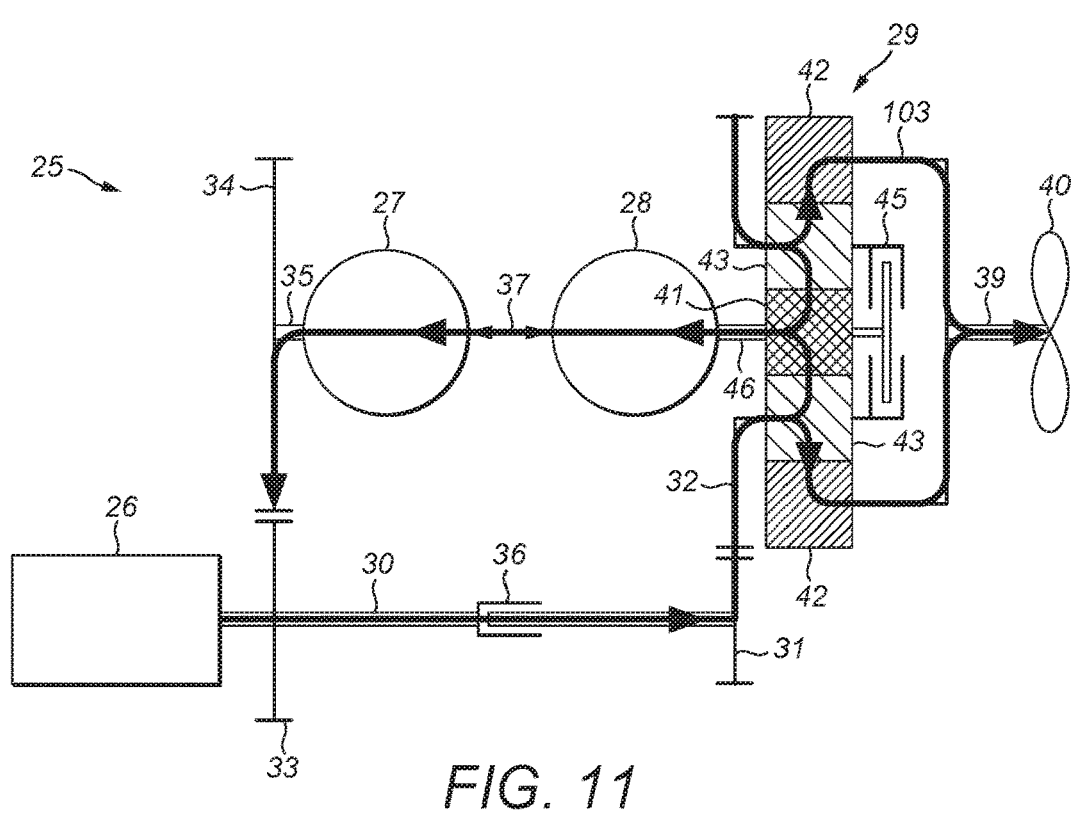
FIG. 11 is a schematic of the propulsion system of FIG. 3 with a reverse operating mode shown.

As shown in FIG. 11, in a reverse power mode 103 power may be transferred to the transmission output shaft 39 via the mechanical route previously disclosed herein. As the plurality of planetary gears 43 rotate they may also rotate the sun gear 41 and second machine shaft 46. The second energy conversion machine 28 may operate as a power generator, thereby providing power to the power transfer arrangement 37. The power transfer arrangement 37 may provide power to the first energy conversion machine 27, thereby rotating the first machine shaft 35. The first energy conversion machine 27 may therefore provide supplementary power to the power unit output shaft 30. The power output of the power unit 26 may be reduced by the same value as the supplementary power provided by the first energy conversion machine 27. Thereby the power unit output shaft 30 may maintain the same rotational power with reduced power unit 26 output. Alternatively, the power transfer arrangement 37 may direct power to components of the power transfer arrangement 37. For example, where the power transfer arrangement 37 is an electrical system, electrical power may be provided to a battery and the like.

Implementation of Different Modes

FIGS. 12 to 16 are nomographs illustrating the operation of the propulsion system 25 as a system output speed 104 is increased. The system output speed axis 105 may represent the rotational speed of the transmission output shaft 39 and is shown as a percentage of rotational output speed of the power unit output shaft 30. A second energy conversion machine speed axis 106 may represent the rotational speed of input/output of the second energy conversion machine 28, wherein 100% is full speed in one rotational direction and −100% is full speed in the opposite rotational direction.

A second energy conversion machine speed 107 may represent the actual rotational speed of the second energy conversion machine 28, the second machine shaft 46 and the sun gear 41 (assuming a 1:1 speed ratio between each). A power unit output speed 108 may represent the rotational speed of the carrier 44, the power unit output shaft 30 and the power unit 26 (assuming a 1:1 speed ratio between the first and second gears 19, 20). A system output speed 104 may represent the rotational speed of the ring gear 42 and the transmission output shaft 39 (assuming a 1:1 speed ratio between the two). The horizontal distance between the lines showing the second energy conversion machine speed 107, power unit output speed 108 and system output speed 104 may represent the gear ratio between the sun gear 41, the carrier 44 and the ring gear 42.

Figure 12:
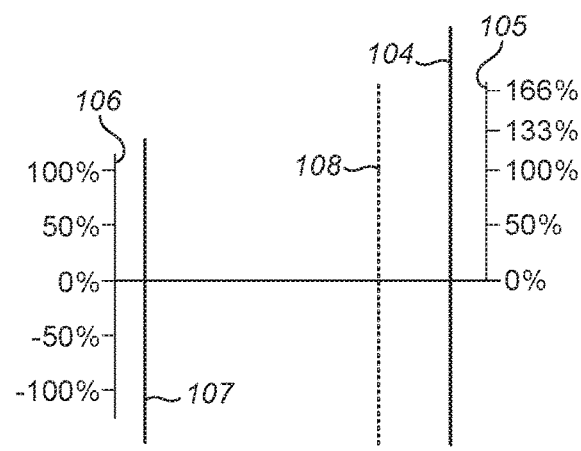
FIGS. 12 to 16 are nomographs illustrating the operation of the propulsion system of FIG. 3 through a sequential increase in system output speed.

FIG. 12 shows the propulsion system 25 when the second energy conversion machine speed 107, power unit output speed 108 and system output speed 104 are zero, for example when the propulsion system 25 is not operational.

The system output speed 104 may be increased from zero by the engagement of the alternate power mode 101. The alternate power mode 101 may be engaged by engaging the transmission lock 45 and disengaging the transmission coupling 36. In the alternate power mode 101, system output speed 104 may be increased by increasing power unit output speed 108 (i.e. by increasing the power output of the power unit 26) until a maximum power unit output speed 109 is reached. The first energy conversion machine 27 may transfer the power to the second energy conversion machine 28 via the power transfer arrangement 37. The second energy conversion machine 28 may drive the transmission 29, which drives the transmission output shaft 39 and thereby provides a system output speed 104.

Figure 13:
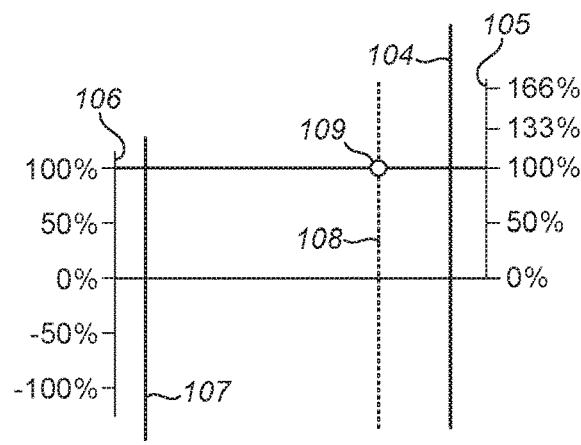

FIG. 13 illustrates the propulsion system 25 operating at maximum power unit output speed 109, which may be when the power output of the power unit 26 is at a maximum. The second machine speed 107 may also be at a maximum at this point.

Figure 14:
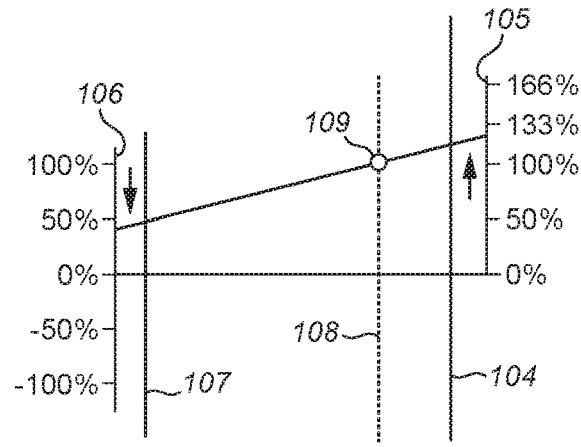

FIG. 14 illustrates a further increase in system output speed 104, which may be implemented by engaging the reverse power mode 103 whilst maintaining the maximum power unit output speed 109. The reverse power mode 103 may be engaged by unlocking the transmission lock 45 and engaging the transmission coupling 36. Power may be transferred from the second energy conversion machine 28 to the first energy conversion machine 27. Maximum power unit output speed 109 may be maintained by providing power from the first energy conversion machine 27 to the power unit output shaft 30 whilst reducing the power output of the power unit 26.

To further increase system output speed 104, the second machine speed 107 may be reduced Increased power may therefore be transferred to the ring gear 42 and thus the system output speed 104 increases.

Figure 15:
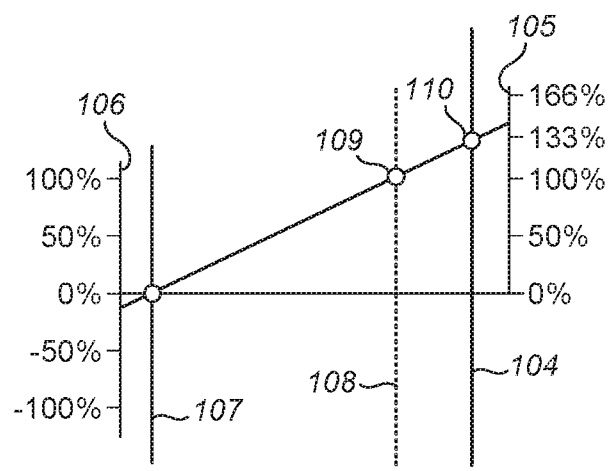

FIG. 15 illustrates the point at which second machine speed 107 reaches zero. The propulsion system 25 may be maintained in the mechanical mode 100 only. The power unit 26 may be designed to operate at peak efficiency at this point and the system output speed 104 at this point may be a cruising speed 110.

Figure 16:
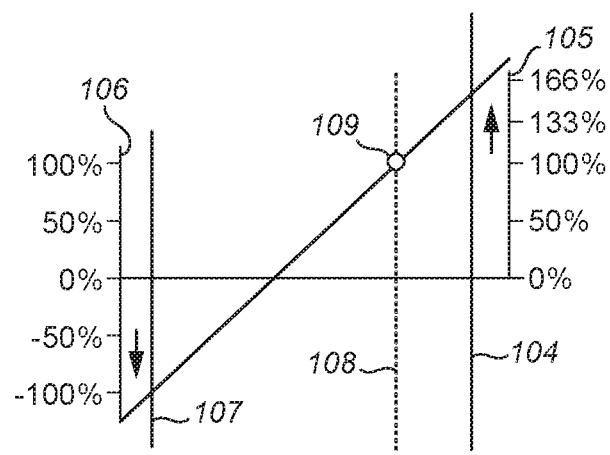

To further increase system output speed 104 above cruising speed 110 the combined power mode 102 may be engaged. As shown in FIG. 16, the system output speed 104 may be increased by increasing second machine speed 107 in the reverse direction.

Whilst the hereinbefore described method of operation for increasing system output speed 104 may be preferable, any other suitable combination of the hereinbefore described modes may be engaged. To reduce system output speed 104 the opposite of the method of operation disclosed above may be followed. Alternatively, any other suitable combination of the hereinbefore described modes may be engaged to reduce system output speed 104.

With reference to the propulsion systems comprising multiple power units 26, 65, 66, each power unit 26, 65, 66 may be sequentially engaged to increase the system output speed 104.

With reference to the propulsion system 64 shown in FIG. 6, power can be transmitted from the first and second power units 65, 66 in different ways in each of the different modes 100, 101, 102, 103 described previously herein. The first torque coupling 79 may be disengaged and the second torque coupling 80 engaged such that power is transmitted from the second power unit 66 only to the first reversible hydraulic machine 67 and the transmission 29. The first and second torque couplings 79, 80 may be engaged such that power is transmitted from the first and second power units 65, 66 to the first reversible hydraulic machine 67 and the transmission 29. Power may be continuously provided from the first and/or second power units 65, 66 to the electrical generator 69 to supply power to the electrical system 70.

The use of multiple power units 65, 66 enables lower rated power units 65, 66 to be used. Furthermore, the use of multiple power units 65, 66 provides the possibility for at least two levels of efficiency for different cruising speeds 110 in the mechanical mode 100. For example, a first cruising speed may be set at the optimum efficiency of output of the second power unit 66 and a second cruising speed at the optimum efficiency of the combined outputs of the first and second power units 65, 66.

With reference to the propulsion system 86 shown in FIG. 7, improved flexibility in terms of the power supply to/from the first and second energy conversion machines 27, 28 may be achieved.

The propulsion systems 25, 64, 86 enable the power units 26, 65, 66 to be selected such that their optimum engine output is at a cruising speed. Alternatively, the optimum engine output may be set to maintain a load factor above 80%, which may still be relatively efficient. The use of multiple power units 26, 65, 66 may improve flexibility as they provide multiple cruising speeds 110 at which efficient operation occurs. Furthermore, power unit size may be reduced via the used of multiple power units 26, 65, 66, thereby potentially improving weight distribution and reducing costs.

Multiple propulsion systems 25, 64, 86 may also be provided such that multiple propulsion elements 40 provide thrust. Each of the propulsion systems 25, 64, 86 may be connected to one another via the power transfer arrangement 37. Therefore, power may be generated in one propulsion system 25, 64, 86 and transferred to another propulsion system 25, 64, 86.

Redundancy may be improved as the power transfer arrangement 37 may comprise batteries for running the second energy conversion machine 28 alone. Safety and electrical losses may be reduced in comparison to a purely electrical drive system, since power can be transferred via a more efficient mechanical route.

Furthermore, the combined improvements in the efficiency and flexibility of the propulsion system 25, 64, 86 may enable fixed pitch propellers to be used whilst maintaining the same flexibility and efficiency obtained from variable pitch propellers. Therefore, shrouds may also be used to improve efficiency further.

The propulsion system 25, 64, 86 may also be easily scaled to large and smaller work machines by simply adapting the size and/or number of the power units 26, 65, 66. For example, such propulsion systems 25, 64, 86 may be implemented in tugboats or large tankers.

In addition, the use of one or more planetary gearboxes for the transmission 29 enables a ship incorporating such a propulsion system 25, 64, 86 to have a smaller keel width than is possible in previously known transmission arrangements for ships. As illustrated in FIG. 4, the transmission 29 may have the gearbox width 47. Where the transmission 29 is a planetary gearbox, the gearbox width 47 may be relatively smaller than the output gear diameter 23 disclosed previously herein when achieving the same gear ratio. This may be due to the compact nature of planetary gearboxes even when a large gear ratio is implemented. Therefore, by utilising a planetary gearbox in a ship the keel width may be reduced.

The invention claimed is:

1. A propulsion system for providing a power output, said propulsion system comprising:
   a transmission configured to provide the power output, the transmission comprising at least one planetary gearbox;
   at least one first energy conversion machine;
   at least one power unit operable to selectively drive at least one of the transmission and the at least one first energy conversion machine;
   at least one second energy conversion machine operable to selectively drive or be driven by the transmission;
   a power transfer arrangement for transferring power between the first and second energy conversion machines; and
   at least one coupling operable to selectively connect and disconnect the at least one power unit and the transmission such that the at least one power unit is operable to drive the at least one first energy conversion machine independently of the transmission,
   wherein the at least one power unit is operable to selectively drive the transmission via at least one drive shaft, at least one transmission coupling, and at least one first kinematic connection element,
   wherein the at least one power unit is operable to selectively drive the at least one first energy conversion machine via the at least one drive shaft and at least one second kinematic connection element, and
   wherein the first and second kinematic connection elements are gears, and the propulsion system further comprises:
      a first gear mounted on a power unit output shaft;
      a second gear interconnected with the first gear and providing a rotatable input to the transmission;
      a third gear mounted on the power unit output shaft; and
      a fourth gear mounted on a first machine shaft and interconnected with the third gear, said first machine shaft providing an input or output to the at least one first energy conversion machine.

2. The propulsion system of claim 1, wherein the at least one first and second energy conversion machines are reversible hydraulic or electrical machines.

3. The propulsion system of claim 2, wherein the power transfer arrangement is hydraulic or electrical.

4. The propulsion system of claim 1, wherein the at least one planetary gearbox comprises a sun gear, a plurality of planetary gears attached to a carrier, and a rotatable ring gear.

5. The propulsion system of claim 4, wherein the sun gear is rotatably connected to the at least one second energy conversion machine, the ring gear is rotatably connected to provide the power output, and the carrier is operably connected to the at least one power unit.

6. The propulsion system of claim 5, wherein the carrier is rotatably connected to the second gear.

7. The propulsion system of claim 5, wherein the power output is provided by a rotatable transmission output shaft and the ring gear is rotatably connected to the transmission output shaft.

8. A method for operating a propulsion system, the propulsion system comprising:
   a transmission configured to provide a power output, the transmission comprising at least one planetary gearbox;
   at least one first energy conversion machine;
   at least one power unit operable to selectively drive at least one of the transmission and the at least one first energy conversion machine;
   at least one second energy conversion machine operable to selectively drive or be driven by the transmission;
   a power transfer arrangement for transferring power between the first and second energy conversion machines; and
   at least one coupling operable to selectively connect and disconnect the at least one power unit and the transmission such that the at least one power unit is operable to drive the at least one first energy conversion machine independently of the transmission,
   wherein the at least one power unit is operable to selectively drive the transmission via at least one drive shaft, at least one transmission coupling, and at least one first kinematic connection element,
   wherein the at least one power unit is operable to selectively drive the at least one first energy conversion machine via the at least one drive shaft and at least one second kinematic connection element, and
   wherein the first and second kinematic connection elements are gears, and the propulsion system further comprises:
      a first gear mounted on a power unit output shaft,
      a second gear interconnected with the first gear and providing a rotatable input to the transmission,
      a third gear mounted on the power unit output shaft, and
      a fourth gear mounted on a first machine shaft and interconnected with the third gear, said first machine shaft providing an input or output to the at least one first energy conversion machine,
   the method comprising:
      providing the power output from the at least one power unit; and
      selectively performing at least one of:
         driving the transmission by connecting the power unit to the transmission,
         driving the at least one first energy conversion machine by connecting the power unit to the at least one first energy conversion machine; and
         transferring power between the first energy conversion machine and the second energy conversion machine, using the power transfer arrangement.

9. The method of claim 8, further comprising a first mode, including transferring power from the power unit to the transmission via at least one first shaft, the at least one first kinematic connection element, and the at least one transmission coupling.

10. The method of claim 9, further comprising a second mode including:
   transferring power from the power unit to the at least one first energy conversion machine via at least one second shaft and at the least one second kinematic connection element; and transferring the power from the at least one first energy conversion machine to the transmission via the power transfer arrangement and the second energy conversion machine.

11. The method of claim 10, further comprising a third mode, wherein the power is transferred simultaneously in the first mode and the second mode.

12. The method of claim 9, further comprising a fourth mode, including:
  transferring the power to the transmission in the first mode; and
  transferring the power from the transmission to the second energy conversion machine.

13. A machine, comprising:
  a transmission configured to provide a power output to a propulsion element, the transmission comprising at least one planetary gearbox;
  at least one first energy conversion machine;
  at least one power unit operable to selectively drive at least one of the transmission and the at least one first energy conversion machine;
  at least one second energy conversion machine operable to selectively drive or be driven by the transmission;
  a power transfer arrangement for transferring power between the first and second energy conversion machines; and
  at least one coupling operable to selectively connect and disconnect the at least one power unit and the transmission such that the at least one power unit is operable to drive the at least one first energy conversion machine independently of the transmission,
  wherein the at least one power unit is operable to selectively drive the transmission via at least one drive shaft, at least one transmission coupling, and at least one first kinematic connection element,
  wherein the at least one power unit is operable to selectively drive the at least one first energy conversion machine via the at least one drive shaft and at least one second kinematic connection element, and
  wherein the first and second kinematic connection elements are gears, and the machine further comprises:
    a first gear mounted on a power unit output shaft;
    a second gear interconnected with the first gear and providing a rotatable input to the transmission;
    a third gear mounted on the power unit output shaft; and
    a fourth gear mounted on a first machine shaft and interconnected with the third gear, said first machine shaft providing an input or output to the at least one first energy conversion machine.

14. The machine of claim 13, wherein the at least one planetary gearbox includes multiple planetary gearboxes arranged in series.

15. The machine of claim 13, wherein the at least one first and second energy conversion machines are reversible hydraulic or electric machines.

* * * * *